United States Patent
Okui (10) Patent No.: US 12,266,966 B2
(45) Date of Patent: Apr. 1, 2025

(54) BATTERY MODULE AND ENERGY STORAGE SYSTEM INCLUDING THE SAME

(71) Applicant: SAMSUNG SDI CO., LTD., Yongin-si (KR)

(72) Inventor: Yoshiaki Okui, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/378,808

(22) Filed: Oct. 11, 2023

(65) Prior Publication Data
US 2024/0266862 A1 Aug. 8, 2024

(30) Foreign Application Priority Data

Feb. 6, 2023 (KR) .................. 10-2023-0015420

(51) Int. Cl.
*H02J 7/04* (2006.01)
*H02J 7/00* (2006.01)

(52) U.S. Cl.
CPC .............. *H02J 7/04* (2013.01); *H02J 7/0014* (2013.01); *H02J 2207/20* (2020.01)

(58) Field of Classification Search
CPC .......... H02J 7/04; H02J 7/0014; H02J 7/0016; H02J 7/0018; H02J 7/0019; H02J 2207/20
See application file for complete search history.

(56) References Cited

U.S. PATENT DOCUMENTS

| | | | |
|---|---|---|---|
| 6,150,795 A | 11/2000 | Kutkut et al. | |
| 9,041,345 B2 | 5/2015 | Choi | |
| 9,673,658 B2* | 6/2017 | Jeong | H02J 7/0018 |
| 2011/0309795 A1* | 12/2011 | Firehammer | H01M 10/4207 320/118 |
| 2013/0234671 A1* | 9/2013 | Choi | H02J 7/0016 320/128 |
| 2014/0079963 A1* | 3/2014 | Takeuchi | H02J 7/0016 429/52 |

FOREIGN PATENT DOCUMENTS

| | | |
|---|---|---|
| CN | 103311963 A | 9/2013 |
| DE | 102011079253 A1 | 1/2013 |
| JP | 2013-126343 A | 6/2013 |
| JP | 2018-170930 A | 11/2018 |

(Continued)

OTHER PUBLICATIONS

Numbered machine translation of KR-101122598-B1 (Year: 2024).*
(Continued)

*Primary Examiner* — David V Henze-Gongola
(74) *Attorney, Agent, or Firm* — Lee IP Law, P.C.

(57) ABSTRACT

An energy storage system including one or more battery cells connected in series, one or more isolated DC/DC converters, each isolated DC/DC converter having one end connected to one battery cell and an other end connected to another battery cell adjacent to the one battery cell so as to equalize a cell voltage through charging and discharging of the two battery cells which are each electrically connected to one of the plurality of battery cells, and a plurality of battery modules each including a controller configured to control a charge mode and a discharge mode of the plurality of isolated DC/DC converters.

16 Claims, 5 Drawing Sheets

(56) References Cited

FOREIGN PATENT DOCUMENTS

| KR | 1122598 B1 | * | 3/2012 | ............ H02J 7/0016 |
|----|------------|---|--------|--------------------------|
| KR | 101122598 B1 | * | 3/2012 | ............ H02J 7/0016 |
| KR | 10-1165593 B1 | | 7/2012 | |
| KR | 10-1397026 B1 | | 5/2014 | |
| KR | 10-1702379 B1 | | 2/2017 | |
| KR | 10-2022-0108340 A | | 8/2022 | |
| KR | 2022108340 A | * | 8/2022 | ....... G01R 19/16542 |
| KR | 10-2022-0146934 A | | 11/2022 | |
| KR | 2022146934 A | * | 11/2022 | ....... G01R 19/16542 |
| WO | WO 2020/026965 A1 | | 2/2020 | |

OTHER PUBLICATIONS

European Search Report dated Jun. 21, 2024, of the corresponding European Patent Application No. 23215099.5.
Korean Office Action dated Jul. 30, 2024, of the corresponding Korean Patent Application No. 10-2023-0015420.
Japanese Office Action dated Sep. 2, 2024, of the corresponding Japanese Patent Application No. 2023-172008.

* cited by examiner

BATTERY MODULE AND ENERGY STORAGE SYSTEM INCLUDING THE SAME

CROSS-REFERENCE TO RELATED APPLICATION

This application claims priority to and the benefit of Korean Patent Application No. 10-2023-0015420 filed on Feb. 6, 2023 in the Korean Intellectual Property Office, the contents of which in its entirety are herein incorporated by reference.

BACKGROUND

1. Field

Various embodiments of the present disclosure relate to a battery module and an energy storage system including the same.

2. Description of the Related Art

In general, energy storage systems (ESSs) are devices which store surplus produced electricity or energy produced through renewable energy in a storage device (for example, a battery) and then supply electricity when the electricity is needed most, thereby improving power use efficiency.

An ESS includes a battery, a system battery management system (BMS) for monitoring a state of the battery and controlling and operating the battery, a power conversion system (PCS) for charging/discharging the battery, and a battery control unit (BCU) for communication with the BMS and the PCS to diagnose the ESS and controlling and monitoring the connection and disconnection of a corresponding battery rack.

SUMMARY

Embodiments are directed to an energy storage system including a plurality of battery cells connected in series, a plurality of isolated DC/DC converters, each isolated DC/DC converter having one end connected to one battery cell and an other end connected to another battery cell adjacent to the one battery cell so as to equalize a cell voltage between two battery cells which are each electrically connected to one of the plurality of battery cells through charging and discharging, a plurality of battery modules each including a controller configured to control a charge mode and a discharge mode of the plurality of isolated DC/DC converters.

The energy storage system wherein the number of the plurality of battery cells may be the same as the number of the plurality of isolated DC/DC converters, the plurality of battery cells may include a first battery cell and second to Xth battery cells which may be sequentially connected in series, and the plurality of isolated DC/DC converters may include a first isolated DC/DC converter and second to Xth isolated DC/DC converters.

The energy storage system wherein the first isolated DC/DC converter may have one end electrically connected to the first battery cell and the other end electrically connected to the second battery cell, and the Xth isolated DC/DC converter may have one end electrically connected to the Xth battery cell and the other end electrically connected to the first battery cell.

The energy storage system wherein the controller may compare an average voltage of the plurality of battery cells with a voltage of each of the battery cells electrically connected to one end of the plurality of isolated DC/DC converters to control through the isolated DC/DC converters the charging/discharging of each of the battery cells electrically connected to the one end of the plurality of isolated DC/DC converters.

The energy storage system may include a battery rack in which each of the plurality of battery modules may be provided and may be electrically connected to each other, wherein a module battery management system (BMS) included in each of the plurality of battery modules may include the plurality of isolated DC/DC converters and the controller, and the controller included in each module BMS may communicate with another module BMS.

The energy storage system wherein the average voltage may be an average voltage of all of the battery cells included in the battery rack, and a battery control unit included in the battery rack may calculate the average voltage and may transmit the calculated average voltage to the plurality of module BMSs included in the battery rack through communication.

The energy storage system may include the isolated DC/DC converter having a transformer electrically connected between the one end and the other end of the isolated DC/DC converter, a first capacitor connected to a primary winding of the transformer in parallel, a second capacitor connected to a secondary winding of the transformer in parallel, a first switching element electrically connected between the first capacitor and the primary winding of the transformer, and a second switching element electrically connected between the second capacitor and the secondary winding of the transformer.

The energy storage system wherein the first switching element and the second switching element may be turned on or off under control of the controller.

The energy storage system wherein the first switching element may include a first electrode electrically connected to a second electrode of the primary winding of the transformer, a second electrode electrically connected to a second electrode of the first capacitor, and a control electrode electrically connected to the controller, the second switching element may include a first electrode electrically connected to a second electrode of the secondary winding of the transformer, a second electrode electrically connected to a second electrode of the second capacitor, and a control electrode electrically connected to the controller, and each of the first switching element and the second switching element may be a transistor including a first electrode as a drain electrode, a second electrode as a source electrode, a control electrode, and a body diode.

The energy storage system may include the isolated DC/DC converter having a transformer electrically connected between the one end and the other end of the isolated DC/DC converter, a first capacitor connected to a primary winding of the transformer in parallel, a second capacitor electrically connected to a first electrode of a secondary winding of the transformer, a first inductor connected to the second capacitor in series, a third capacitor connected to the secondary winding of the transformer in parallel, a first switching element electrically connected between the first capacitor and the primary winding of the transformer, and a second switching element including a first electrode electrically connected between the second capacitor and the first inductor and a second electrode electrically connected between the secondary winding of the transformer and the third capacitor.

The energy storage system wherein the first switching element may include a first electrode electrically connected to a first electrode of the first capacitor, a second electrode electrically connected to a first electrode of the primary winding of the transformer, and a control electrode electrically connected to the controller, the second switching element may include the first electrode electrically connected between the second capacitor and the first inductor, the second electrode electrically connected to a second electrode of the secondary winding of the transformer, and a control electrode electrically connected to the controller, and each of the first switching element and the second switching element may be a transistor including a first electrode as a drain electrode, a second electrode as a source electrode, a control electrode, and a body diode.

The energy storage system wherein the average voltage may be an average voltage of all of the battery cells included in the battery rack, and each of the plurality of module BMSs calculates the average voltage through receiving from each of the plurality of battery modules information regarding the average voltage of their respective plurality of battery cells.

The wherein each isolated DC/DC converter, excepting a last isolated DC/DC converter, may have one end connected to one battery cell and the other end connected to another battery cell immediately adjacent to the one battery cell to equalize a cell voltage between the one and another battery cells through charging and discharging, and the last isolated DC/DC converter may have one end connected to the last battery cell and an other end connected to the first battery cell so as to equalize a cell voltage between the first battery cell and the last battery cell.

A battery module including a plurality of battery cells connected in series, a plurality of isolated DC/DC converters, each isolated DC/DC converter having one end connected to one battery cell and an other end connected to another battery cell adjacent to the one battery cell so as to equalize a cell voltage between two battery cells which are each electrically connected to one of the plurality of battery cells through charging and discharging, and a controller configured to control a charge mode and a discharge mode of the plurality of isolated DC/DC converters.

The battery module wherein the number of the plurality of battery cells may be the same as the number of the plurality of isolated DC/DC converters, the plurality of battery cells may include a first battery cell and second to Xth battery cells which are sequentially connected in series, and the plurality of isolated DC/DC converters may include a first isolated DC/DC converter and second to Xth isolated DC/DC converters.

The battery module wherein the first isolated DC/DC converter may have one end electrically connected to the first battery cell and the other end electrically connected to the second battery cell, and the Xth isolated DC/DC converter may have one end electrically connected to the Xth battery cell and the other end electrically connected to the first battery cell.

The battery module wherein the controller may compare an average voltage of the plurality of battery cells with a voltage of each of the battery cells electrically connected to one end of the plurality of isolated DC/DC converters to control charging/discharging of each of the battery cells electrically connected to the one end through the isolated DC/DC converters.

The battery module may include the isolated DC/DC converter having a transformer electrically connected between the one end and the other end of the isolated DC/DC converter, a first capacitor connected to a primary winding of the transformer in parallel, a second capacitor connected to a secondary winding of the transformer in parallel, a first switching element electrically connected between the first capacitor and the primary winding of the transformer, and a second switching element electrically connected between the second capacitor and the secondary winding of the transformer.

The battery module may include the isolated DC/DC converter having a transformer electrically connected between the one end and the other end of the isolated DC/DC converter, a first capacitor connected to a primary winding of the transformer in parallel, a second capacitor electrically connected to a first electrode of a secondary winding of the transformer, a first inductor connected to the second capacitor in series, a third capacitor connected to the secondary winding of the transformer in parallel, a first switching element electrically connected between the first capacitor and the primary winding of the transformer, and a second switching element including a first electrode electrically connected between the second capacitor and the first inductor and a second electrode electrically connected between the secondary winding of the transformer and the third capacitor.

The battery module wherein each isolated DC/DC converter, excepting a last isolated DC/DC converter, may have one end connected to one battery cell and the other end connected to another battery cell immediately adjacent to the one battery cell to equalize a cell voltage between the one and another battery cells through charging and discharging, and the last isolated DC/DC converter may have one end connected to the last battery cell and an other end connected to the first battery cell so as to equalize a cell voltage between the first battery cell and the last battery cell.

BRIEF DESCRIPTION OF DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms. These embodiments are provided so that this disclosure will be thorough and complete, and will fully convey exemplary implementations to those skilled in the art.

Hereinafter, embodiments of the present disclosure will be described in detail with reference to the accompanying drawings.

Embodiments of the present disclosure are provided to describe the present disclosure more completely to those having ordinary skill in the art. The following embodiments may be modified into various different forms. Rather, the embodiments are provided so that the present disclosure will be thorough and complete and will convey the concept of the present disclosure to those skilled in the art.

As used herein, the term "and/or" includes any and all combinations of one or more of the associated listed items. In addition, in the present specification, it will be understood that, when member A is referred to as being "connected to" member B, member A may be directly connected to member B or intervening member C may be present therebetween such that member A and member B are indirectly connected to each other.

The terminology used herein is for the purpose of describing particular embodiments only and is not intended to limit the present disclosure. As used herein, the singular forms are intended to include the plural forms as well, unless the context clearly indicates otherwise. It will be further understood that the terms "comprise or include" and/or "comprising or including," when used in this specification, specify the presence of stated shapes, numbers, steps, operations, members, elements, and/or groups thereof but do not preclude the presence or addition of one or more other shapes, numbers, steps, operations, members, elements, and/or groups thereof.

Embodiments of the present disclosure will be described in detail with reference to accompanying drawings such that those skilled in the art can fully understand and carry out the present disclosure.

The same reference numerals are assigned to the same elements throughout the drawings. In the specification, when an element is referred to as being "electrically connected" to another element, it can be directly connected or coupled to the another element or indirectly connected or coupled to the another element with one or more intervening elements therebetween.

Figure 1:
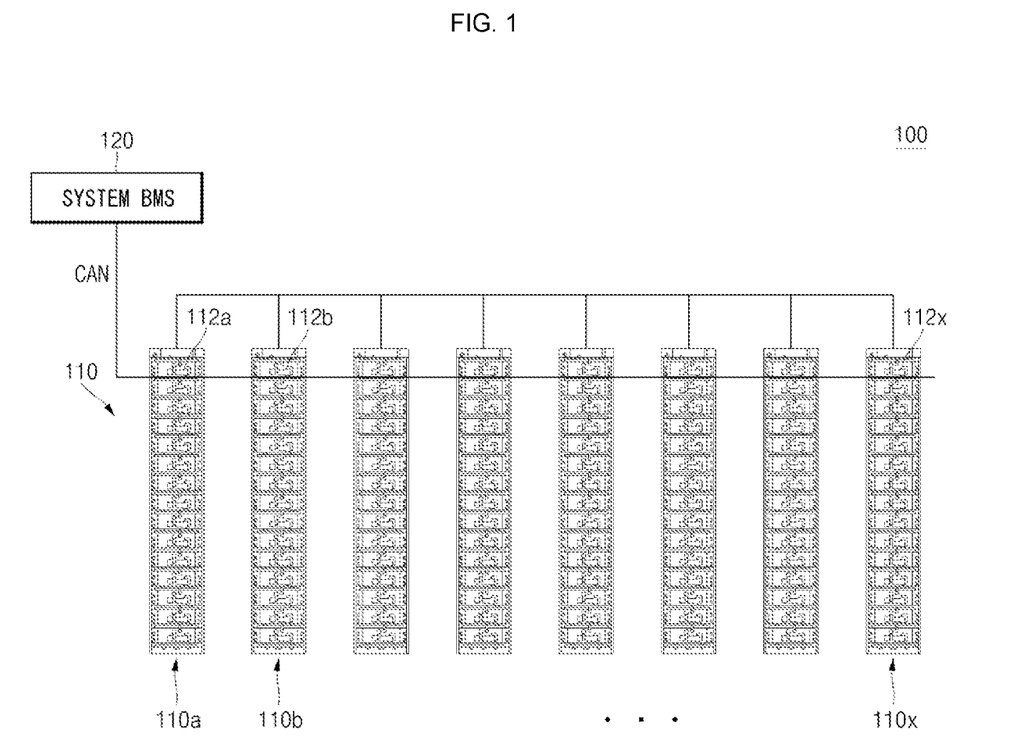
FIG. 1 is a conceptual view showing an energy storage system of the present disclosure.
Figure 2A:
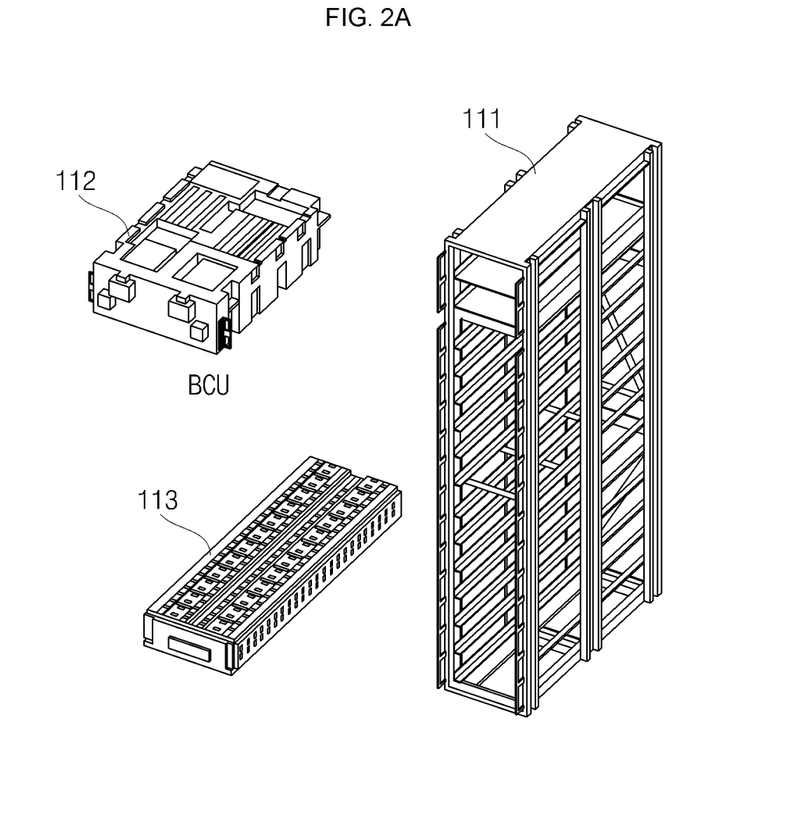
FIG. 2A is an exploded, perspective view of a battery rack of the energy storage system shown in FIG. 1.
Figure 2B:
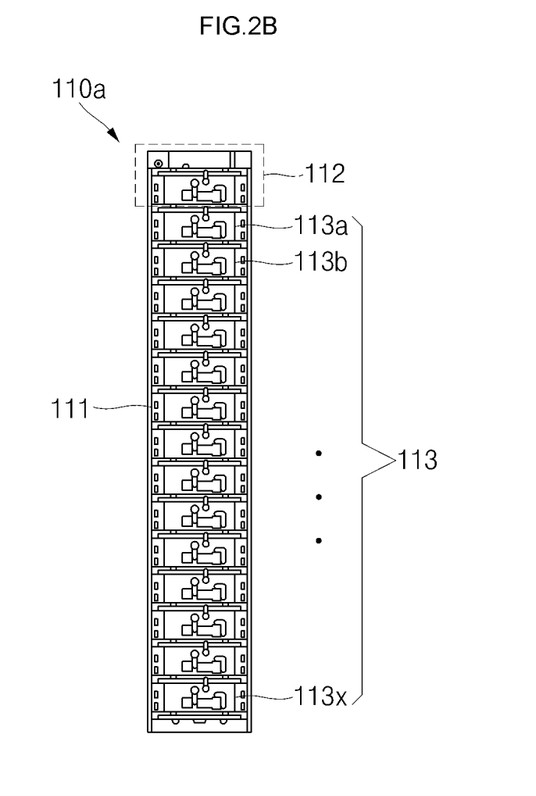
FIG. 2B is a front view of a battery rack of the energy storage system shown in FIG. 1.

FIG. 1 is a conceptual view showing an energy storage system of the present disclosure. FIG. 2A is an exploded, perspective view of a battery rack of the energy storage system shown in FIG. 1. FIG. 2B is a front view of a battery rack of the energy storage system shown in FIG. 1

Figure 3:
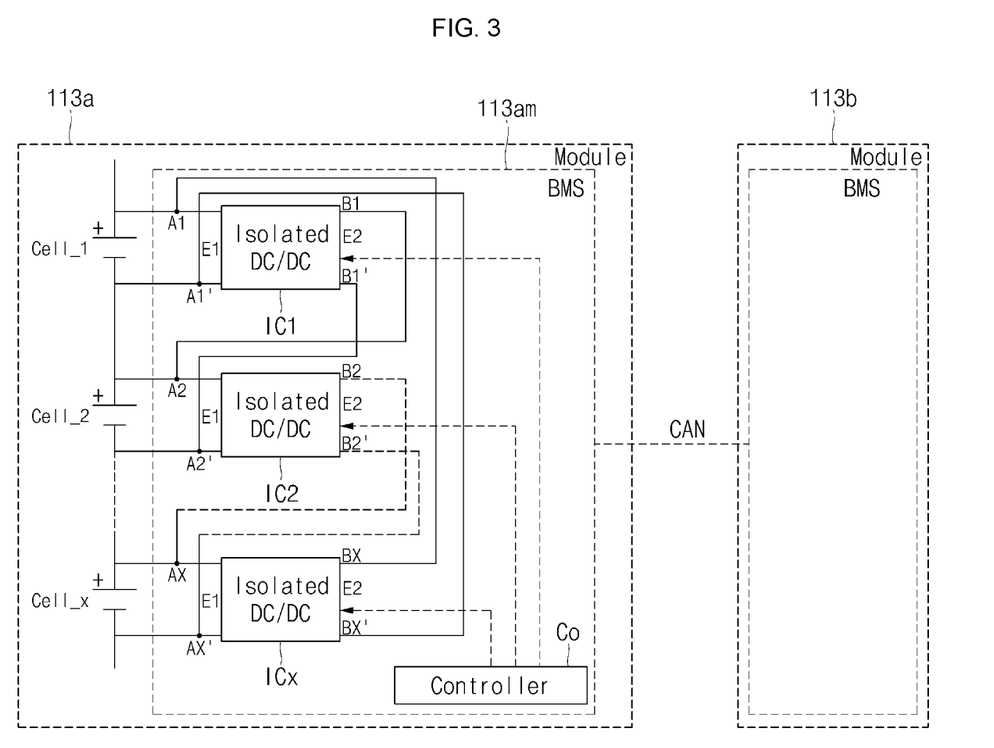
FIG. 3 is a schematic view showing a configuration of a cell balancing device of the energy storage system according to embodiments of the present disclosure.

Referring to FIG. 3, a schematic view showing a configuration of a cell balancing device of the energy storage system according to embodiments of the present disclosure is shown. Hereinafter, the cell balancing device of the energy storage system according to various embodiments of the present disclosure will be described with reference to FIGS. 1 to 3. In some embodiment, the cell balancing device may be applicable to other devices and systems to which a plurality of battery cells are applied.

First, an energy storage system 100 includes two or more battery racks 110. Here, a plurality of battery racks 110a, 110b, . . . , and 110x may be electrically connected to each other. In some embodiment, in each of the battery racks 110a, 110b, . . . , and 110x, high power terminals (positive and negative electrodes) may be exposed to the outside. For example, the high power terminals may be accessible from outside the battery rack. The high power terminals of the battery racks 110a, 110b, . . . , and 110x may be electrically connected to each other. In some embodiment, the plurality of battery racks 110a, 110b, . . . , and 110x may include battery control units (BCUs) 112a, 112b, . . . , and 112x, respectively.

Each of the battery racks 110a, 110b, . . . , and 110x may include a plurality of battery modules 113 electrically connected to each other. The plurality of battery modules 113 included in each of the battery racks 110a, 110b, . . . , and 110x may be connected in series. In an implementation, a first battery rack 110a may include a rack frame 111 for accommodating a plurality of battery modules 113a, 113b, . . . , and 113x, and the plurality of battery modules 113a, 113b, . . . , and 113x may be electrically connected in series after being accommodated in a rack frame 111. Here, a first battery rack 110a may be accommodated to have a form in which the plurality of battery modules 113a, 113b, . . . , and 113x are vertically stacked in the rack frame 111. In an embodiment, in the first battery rack 110a, a BCU 112 may be accommodated in an uppermost portion of the rack frame 111.

In some embodiments, each of the plurality of battery racks 110a, 110b, . . . , and 110x may include a plurality of battery modules 113a, 113b, . . . , and 113x and one BCU 112. In some embodiments, the BCUs of the battery racks 110a, 110b, . . . , and 110x may be connected to each other through a general-purpose communication line CAN (for example, a control area network (CAN)).

The first battery rack 110a may be connected to the high power terminals through fuses and switches. In some embodiments, the BCU 112 included in the first battery rack 110a may control the driving of the fuses and the switches according to physical quantities, e.g., voltage, current, or resistance, measured in the plurality of battery modules 113a, 113b, . . . , and 113x to perform control such that voltages of the plurality of battery modules 113a, 113b, . . . , and 113x included in the first battery rack 110a are input/output to the outside through the high power terminals.

Each of the plurality of battery racks 110a, 110b, . . . , and 110x may be structurally similar to the first battery rack 110a. Hereinafter, for convenience of description, among the plurality of battery racks 110a, 110b, . . . , and 110x, the first battery rack 110a will be mainly described.

In some embodiments, each of the plurality of battery modules 113a, 113b, . . . , and 113x may include a plurality of battery cells Cell_1, Cell_2, . . . , and Cell_X, and the plurality of battery cells Cell_1, Cell_2, . . . , and Cell_X included in each of the battery modules 113a, 113b, . . . , and 113x may be electrically connected in series. In an implementation, a first battery module 113a may further include a module battery management system (BMS) 113 $am$. The module BMS 113 $am$ may measure and/or control physical quantities (e.g., voltage, resistance, or current) of the plurality of battery cells Cell_1, Cell_2, . . . , and Cell_X included in the battery module 113 and may transmit the resulting data to the BCU in the case of an abnormality.

Each of the plurality of battery modules 113a, 113b, . . . , and 113x may be structurally similar to the first battery module 113a. Hereinafter, for convenience of description, among the plurality of battery modules 113a, 113b, . . . , and 113x, the first battery module 113a will be mainly described.

The module BMS 113 $am$ included in the first battery module 113a may equalize cell voltages of a plurality of battery cells Cell_1, Cell_2, . . . , and Cell_X included in the first battery module 113a. FIG. 3 illustrates only a cell voltage equalization device in the module BMS 113 $am$, and additionally, the module BMS 113 $am$ may further include a component for measuring and/or controlling physical quantities of the battery cells Cell_1, Cell_2, . . . , and Cell_X. Hereinafter, for convenience of description, the module BMS 113 $am$ will be described as the cell voltage equalization device rather than in its other forms as a component for measuring and/or controlling other physical quantities, e.g., current or resistance.

The configuration and operation of the cell voltage equalization device 113 am will be described in detail below.

The module BMS 113 am of the first battery module 113a may be connected to each of the module BMSs included in the plurality of battery modules 113a, 113b, . . . , and 113x through a general-purpose communication line CAN. In some embodiments, the module BMS 113 am of the first battery module 113a may be connected to a BCU 112a of the first battery rack 110a through a general-purpose communication line CAN. The BCU 112a may manage and control the module each BMS of the plurality of battery modules 113a, 113b, . . . , and 113x included in the first battery rack 110a.

Additionally, in the energy storage system 100, the BCUs 112 included in the plurality of battery racks 110a, 110b, . . . , and 110x may all be connected to a system BMS 120 through a general-purpose communication line CAN. The system BMS 120 may manage and control the BCUs 112 included in the plurality of battery racks 110a, 110b, . . . , and 110x. The system BMS 120 may be a master BMS.

The cell voltage equalization device 113 am may include a same number of isolated DC/DC converters IC1, IC2, . . . , and ICX as a number of battery cells Cell_1, Cell 2, . . . , and Cell_X. In some embodiments, the plurality of battery cells Cell_1, Cell_2, . . . , and Cell_X may be electrically connected to a plurality of isolated DC/DC converters IC1, IC2, . . . , and ICX, respectively.

In an implementation, the cell voltage equalization device 113 am may include a first isolated DC/DC converter IC1 electrically connected to a first battery cell Cell_1, a second isolated DC/DC converter IC2 electrically connected to a second battery cell Cell_2, and an $X^{th}$ isolated DC/DC converter ICX electrically connected to an $X^{th}$ battery cell Cell_X.

Here, the plurality of battery cells Cell_1, Cell_2, . . . , and Cell_X may be sequentially connected in series. As an example, a positive electrode of the second battery cell Cell_2 may be electrically connected to a negative electrode of the first battery cell Cell_1, a positive electrode of the third battery cell Cell_3 may be electrically connected to a negative electrode of the second battery cell Cell_2, and a positive electrode of the $X^{th}$ battery cell Cell_X may be electrically connected to a negative electrode of an $(X-1)^{th}$ battery cell Cell_X-1. As an example, if the number of battery cells Cell_1, Cell_2, . . . , and Cell_X connected in series is 12, the $X^{th}$ battery cell Cell_X may be a twelfth battery cell Cell_12. In some embodiments, the number of the plurality of battery cells Cell_1, Cell_2, . . . , and Cell_X may be 3 or more.

In some embodiments, one end's E1 electrodes A1 and A1' of a first isolated DC/DC converter IC1 may be electrically connected to positive and negative electrodes of the first battery cell Cell_1, respectively, and an other end's E2 electrodes B1 and B1' thereof may be electrically connected to positive and negative electrodes of the second battery cell Cell_2, whose positive electrode is connected to the negative electrode of the first battery cell Cell_1, respectively. That is, the first isolated DC/DC converter IC1 adjusts a voltage between the first battery cell Cell_1 and the second battery cell Cell_2, thereby equalizing a cell voltage between the first battery cell Cell_1 and the second battery cell Cell_2.

One end's E1 electrodes A2 and A2' of a second isolated DC/DC converter IC2 may be electrically connected to positive and negative electrodes of the second battery cell Cell_2, respectively, and an other end's E2 electrodes B2 and B2' thereof may be electrically connected to positive and negative electrodes of the third battery cell Cell_3, whose positive electrode is connected to the negative electrode of the second battery cell Cell_2, respectively. That is, the second isolated DC/DC converter IC2 adjusts a voltage between the second battery cell Cell_2 and the third battery cell Cell_3, thereby equalizing a cell voltage between the second battery cell Cell_2 and the third battery cell Cell 3.

In some embodiments, one end's E1 electrodes AX and AX' of a $X^{th}$ isolated DC/DC converter ICX may be electrically connected to positive and negative electrodes of a $X^{th}$ battery cell Cell_X, respectively, and an other end's E2 electrodes BX and BX' thereof may be electrically connected to the positive and negative electrodes of the first battery cell Cell_1, respectively. Here, the $X^{th}$ isolated DC/DC converter ICX may be the last battery cell among the plurality of battery cells Cell_1, Cell_2, . . . , and Cell_X connected in series, and the other end's E2 electrodes BX and BX' thereof may be electrically connected to the positive and negative electrodes of the first battery cell Cell_1, which is the first cell, respectively. That is, the $X^{th}$ isolated DC/DC converter ICX adjusts a voltage between the $(X-1)^{th}$ battery cell Cell_X-1 and the $X^{th}$ battery cell Cell_X, thereby equalizing a cell voltage between the $(X-1)^{th}$ battery cell Cell_X-1 and the $X^{th}$ battery cell Cell_X.

The plurality of isolated DC/DC converters IC1, IC2, . . . , and ICX may equalize a cell voltage between two adjacent battery cells among the plurality of battery cells Cell_1, Cell_2, . . . , and Cell_X.

A controller Co may control the first isolated DC/DC converter IC1 to charge or discharge the first battery cell Cell_1 electrically connected to the one end's E1 electrodes A1 and A1'. In some embodiments, the controller Co may be electrically connected to the plurality of isolated DC/DC converters IC1, IC2, . . . , and ICX to control charging/discharging by the plurality of isolated DC/DC converters IC1, IC2, . . . , and ICX. In some embodiments, if the first battery cell Cell_1 is discharged by the first isolated DC/DC converter IC1, the second battery cell Cell_2 may be charged with a discharge voltage of the first battery cell Cell_1 through the first isolated DC/DC converter IC1.

The controller Co may compare an average voltage Va of the plurality of battery cells Cell_1, Cell_2, . . . , and Cell_X with a voltage of the first battery cell Cell_1 electrically connected to the one end's E1 electrodes A1 and A1' of the first isolated DC/DC converter IC1. In this case, if the voltage of the first battery cell Cell_1 is lower than the average voltage Va, the controller Co may allow the first battery cell Cell_1 to be charged, and if the voltage of the first battery cell Cell_1 is higher than the average voltage Va, the controller Co may allow the first battery cell Cell_1 to be discharged.

Here, the average voltage Va may be an average voltage Va of the plurality of battery cells Cell_1, Cell_2, . . . , and Cell_X included in the first battery module 113a. Additionally, the average voltage Va may be not only the average voltage Va of the first battery module 113a but also an average voltage of all battery cells included in the entire first battery rack 110a, which is an average of average voltages of other battery modules 113b, . . . , and 113x. Here, the module BMS 113 am of the first battery module 113a may receive an average voltage through communication with the module BMSs of other battery modules 113b, . . . , and 113x, or the BCU 112a may receive an average voltage of the battery cells included in each of the battery modules 113a, 113b, . . . , and 113x from the module BMS included in each of the plurality of battery modules 113a, 113b, . . . , and 113x included in the first battery rack 110a, thereby calculating an average voltage of all battery cells included in the first battery rack 110a. In some embodiments, the BCU 112a may transmit the calculated average voltage through communication with the module BMS 113 included in each of the plurality of battery modules 113a, 113b, . . . , and 113x. As another example, since the BCU 112a measures voltages of all battery cells included in the battery rack 110, the BCU 112a may calculate an average cell voltage to transmit the calculated average cell voltage to the module BMSs included in the battery rack 110.

Figure 4:
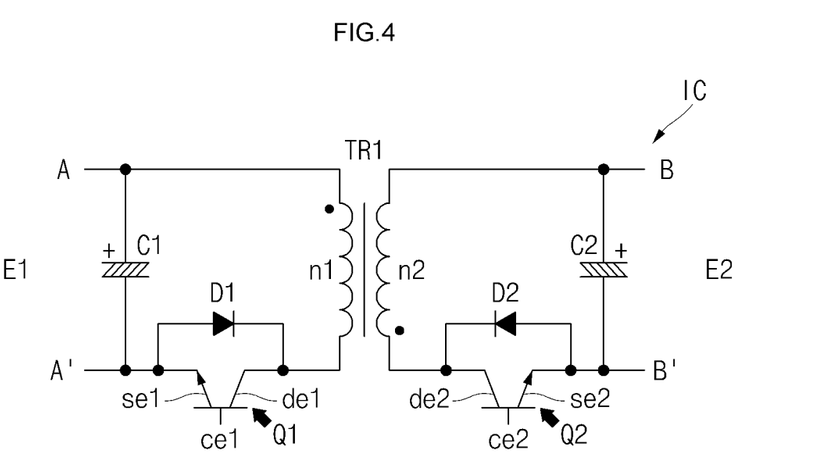
FIG. 4 is a circuit diagram showing an example of an isolated DC/DC converter in the cell balancing device of the energy storage system shown in FIG. 3.

Referring to FIG. 4, an example of an isolated DC/DC converter in the cell balancing device of the energy storage system of FIG. 3 is shown. As shown in FIG. 4, the isolated DC/DC converter IC may include a first capacitor C1 connected to a primary winding n1 of a transformer TR1 in parallel between one end's E1 electrodes A and A', a second capacitor C2 connected to a secondary winding n2 of the transformer TR1 in parallel between an other end's E2 electrodes B and B', the transformer TR1 between the one end E1 and the other end E2, a first switching element Q1 between the primary winding n1 of the transformer TR1 and the first capacitor C1, and a second switching element Q2 between the secondary winding n2 of the transformer TR1 and the second capacitor C2. Here, the one end's E1 electrodes A and A' and the other end's E2 electrodes B and B' may be electrically connected to a positive electrode and a negative electrode of a battery cell. For example, if the isolated DC/DC converter is the first isolated DC/DC converter IC1, the one end's E1 electrodes A and A' may be connected to the positive and negative electrodes of the first battery cell Cell_1, and the other end's E2 electrodes B and B' may be connected to the positive and negative electrodes of the second battery cell Cell_2.

A first electrode of the first capacitor C1 may be electrically connected to a first electrode A of the one end's E1 electrodes A and A', and a second electrode thereof may be electrically connected to a second electrode A' of the one end's E1 electrodes A and A' and a second electrode of the first switching element Q1.

A first electrode of the first switching element Q1 may be electrically connected to a second electrode of the primary winding n1 of the transformer TR1, and the second electrode thereof may be electrically connected to the second electrode of the first capacitor C1 and the second electrode A' of the one end's E1 electrodes A and A'. A control electrode ce1 of the first switching element Q1 may be electrically connected to the controller Co, and thus the first switching element Q1 may be turned on or off by a signal applied from the controller Co. The first switching element Q1 may be a transistor (field effect transistor (FET)) which includes a first electrode as a drain electrode de1, a second electrode as a source electrode se1, a control electrode ce1, and a body diode D1.

A first electrode of the second switching element Q2 may be electrically connected to a second electrode of the secondary winding n2 of the transformer TR1, and a second electrode thereof may be electrically connected to a second electrode of the second capacitor C2 and a second electrode B' of the other end's E2 electrodes B and B'. A control electrode ce1 of the second switching element Q2 may be electrically connected to the controller Co, and thus the second switching element Q2 may be turned on or off by a signal applied from the controller Co. The second switching element Q2 may be a transistor (FET) which includes a first electrode as a drain electrode de1, a second electrode as a source electrode se1, a control electrode ce1, and a body diode D2.

A first electrode of the second capacitor C2 may be electrically connected to a first electrode B of the other end's E2 electrodes B and B' and a first electrode of the secondary winding n2 of the transformer TR1, and the second electrode thereof may be electrically connected to the second electrode B' of the other end's E2 electrodes B and B' and the second electrode of the second switching element Q2.

In the isolated DC/DC converter IC, if the first switching element Q1 is turned on, a battery cell connected to the one end's E1 electrodes A and A' may be discharged. If the first switching element Q1 is turned on, the battery cell connected to the one end's E1 electrodes A and A' becomes a voltage source, and a voltage corresponding to a voltage of the battery cell is applied to the primary winding n1 of the transformer TR1. In this case, a current of the transformer TR1 may increase. Also, a voltage corresponding to a turns ratio is applied to the secondary winding n2 of the transformer TR1. However, if the second switching element Q2 is in an off state, a current does not flow due to a diode D2 of the second switching element Q2.

In this case, if the first switching element Q1 is turned off, a current may flow through the secondary winding n2 and the diode D2 of the second switching element Q2 by the magnetic flux of the primary winding n1 of the transformer TR1. In this case, as the second capacitor C2 is charged, a current flowing in the transformer TR1 may gradually decrease.

That is, in the isolated DC/DC converter IC, if the first switching element Q1 is turned on, energy stored in the transformer TR1 may be transmitted to and stored in the second capacitor C2. In some embodiments, the first capacitor C1 and the second capacitor C2 may smooth a current through the transformer TR1 during charging and discharging.

Here, in the isolated DC/DC converter IC, since one battery cell is electrically connected to each of the primary winding n1 and the secondary winding n2 of the transformer TR1, the first switching element Q1 and the second switching element Q2 may have a switch withstand voltage corresponding to that of one battery cell. In general, as a switch withstand voltage increases, the size and price of a switching element may increase, but since the first switching element Q1 and the second switching element Q2 only need to have a switch withstand voltage corresponding to that of one battery cell, it is possible to prevent increases in size and price.

In some embodiments, in the isolated DC/DC converter IC, a case in which the battery cell connected to the one end's E1 electrodes A and A' is charged corresponds to a case in which a battery cell connected to the other end's E2 electrodes B and B' is discharged, and thus the first switching element Q1 and the second switching element Q2 may operate in reverse.

In the isolated DC/DC converter IC, if a voltage of the battery cell connected to the one end's E1 electrodes A and A' is higher than the average voltage Va, the first switching element Q1 may be turned on to discharge the battery cell. In this case, a voltage discharged from the battery cell connected to the one end's E1 electrodes A and A' may be transmitted to the battery cell connected to the other end's E2 electrodes B and B' of the isolated DC/DC converter IC.

In some embodiments, on the contrary, in the isolated DC/DC converter IC, if the voltage of the battery cell connected to the one end's E1 electrodes A and A' is lower than the average voltage Va, the second switching element Q2 may be turned on to charge the battery cell connected to the one end's E1 electrodes A and A'. In this case, a voltage discharged from the battery cell connected to the other end's E2 electrodes B and B' may be transmitted to the battery cell connected to the one end's E1 electrodes A and A' of the isolated DC/DC converter IC.

That is, in the energy storage system 100, since cell voltages are equalized by charging/discharging adjacent cells, it is possible to prevent efficiency from being reduced if discharging is performed through resistors to equalize cell voltages. In some embodiments, in the energy storage system 100, since cell voltages are equalized by charging/discharging one battery cell and one adjacent battery cell, it is possible to prevent increases in size and costs, which are for improving a switch withstand voltage characteristics, from occurring if cells are directly equalized with a plurality of battery cells connected in series.

Figure 5:
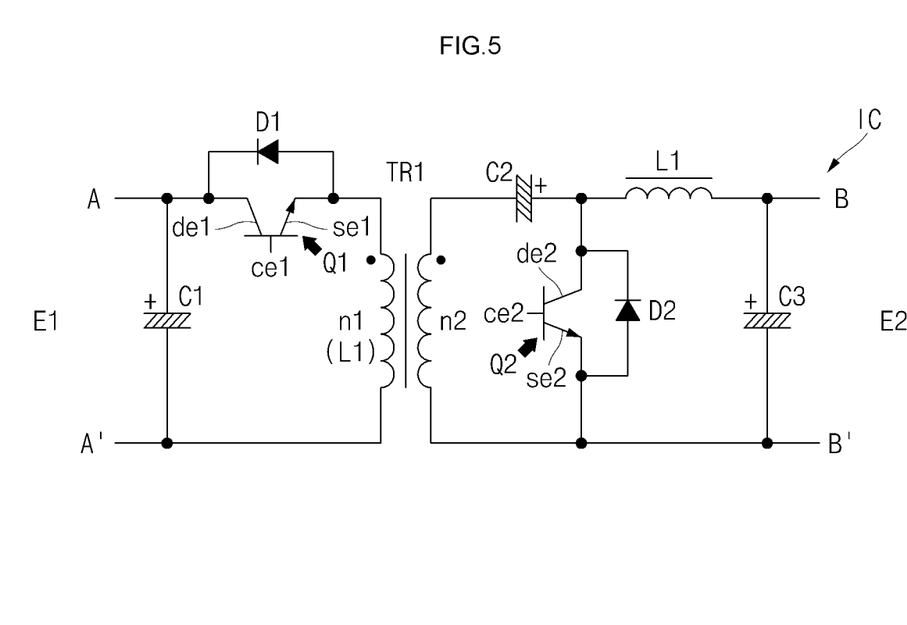
FIG. 5 is a circuit diagram showing another example of an isolated DC/DC converter in the cell balancing device of the energy storage system shown in FIG. 3.

Referring to FIG. 5, another example of an isolated DC/DC converter in the cell balancing device of the energy storage system of FIG. 3 is shown. As shown in FIG. 5, the isolated DC/DC converter IC may include a first capacitor C1 connected to a primary winding n1 of a transformer TR1 in parallel between one end's E1 electrodes A and A', a third capacitor C3 connected to a secondary winding n2 of the transformer TR1 in parallel between an other end's E2 electrodes B and B', the transformer TR1 between the one end E1 and the other end E2, a first switching element Q1 between the primary winding n1 of the transformer TR1 and the first capacitor C1, a second capacitor C2 and a first inductor L1 between the secondary winding n2 of the transformer TR1 and the third capacitor C3, and a second switching element Q2 connected to the secondary winding n2 of the transformer TR1 and the third capacitor C3 in parallel. Here, the one end's E1 electrodes A and A' and the other end's E2 electrodes B and B' may be electrically connected to a positive electrode and a negative electrode of a battery cell. For example, if the isolated DC/DC converter is the first isolated DC/DC converter IC1, the one end's E1 electrodes A and A' may be connected to the positive and negative electrodes of the first battery cell Cell_1, and the other end's E2 electrodes B and B' may be connected to the positive and negative electrodes of the second battery cell Cell_2.

A first electrode of the first capacitor C1 may be electrically connected to a first electrode A of the one end's E1 electrodes A and A' and a first electrode of the first switching element Q1, and a second electrode thereof may be electrically connected to a second electrode A' of the one end's E1 electrodes A and A' and a second electrode of the first winding n1 of the transformer TR1.

The first electrode of the first switching element Q1 may be electrically connected to the first electrode A of the one end's E1 electrodes A and A' and the first electrode of the first capacitor C1, and a second electrode thereof may be electrically connected to a first electrode of the first winding n1 of the transformer TR1. A control electrode ce1 of the first switching element Q1 may be electrically connected to the controller Co, and thus the first switching element Q1 may be turned on or off by a signal applied from the controller Co. The first switching element Q1 may be a transistor (FET) which includes a first electrode as a drain electrode de1, a second electrode as a source electrode se1, a control electrode ce1, and a body diode D1.

A first electrode of the second capacitor C2 may be electrically connected to a first electrode of the secondary winding n2 of the transformer TR1, and a second electrode thereof may be electrically connected to a first electrode of the second switching element Q2 and a first electrode of the first inductor L1.

The first electrode of the second switching element Q2 may be electrically connected to the second electrode of the second capacitor C2 and the first electrode of the first inductor L1, and a second electrode thereof may be electrically connected to a second electrode of the secondary winding n2 of the transformer TR1 and a second electrode of the third capacitor C3. A control electrode ce1 of the second switching element Q2 may be electrically connected to the controller Co, and thus the second switching element Q2 may be turned on or off by a signal applied from the controller Co. The second switching element Q2 may be a transistor (FET) which includes a first electrode as a drain electrode de1, a second electrode as a source electrode se1, a control electrode ce1 and a body diode D2.

A first electrode of the third capacitor C3 may be electrically connected to a second electrode of the first inductor L1 and a first electrode of the other end's E2 electrodes B and B', and the second electrode thereof may be electrically connected to the second electrode of the second switching element Q2, the second electrode of the secondary winding n2 of the transformer TR1, and a second electrode of the other end's E2 electrodes B and B'.

The first electrode of the first inductor L1 may be electrically connected to the second electrode of the second capacitor C2 and the first electrode of the second switching element Q2, and the second electrode thereof may be electrically connected to the first electrode of the third capacitor C3 and the first electrode B of the other end's E2 electrodes B and B'.

In the isolated DC/DC converter IC, if the first switching element Q1 is turned on, a battery cell connected to the one end's E1 electrodes A and A' may be discharged. If the first switching element Q1 is turned on, the battery cell connected to the one end's E1 electrodes A and A' becomes a voltage source, and a voltage corresponding to a voltage of the battery cell is applied to the primary winding n1 of the transformer TR1. Also, a voltage corresponding to a turns ratio is applied to the secondary winding n2 of the transformer TR1. In some embodiments, a voltage obtained by adding a voltage of the second capacitor C2 to a voltage of the secondary winding n2 of the transformer TR1 is applied to the first inductor L1 and the third capacitor C3, and a current due to the applied voltage flows to the third capacitor C3 so that power is transmitted to the other end's E2 electrodes B and B'.

In this case, if the first switching element Q1 is turned off, due to the magnetic flux caused by an excitation current of the transformer TR1, a current flows through the secondary winding n2 and a diode D2 of the second switching element Q2 to charge the second capacitor C2. In some embodiments, at the same time, since a current flowing in the first inductor L1 continues to flow, a current flowing through the diode D2 of the second switching element Q2 via the third capacitor C3 gradually decreases.

That is, in the isolated DC/DC converter IC, if the first switching element Q1 is turned on, energy stored in the transformer TR1 may be transmitted to and stored in the third capacitor C3. In some embodiments, the first capacitor C1 and the third capacitor C3 may smooth a current through the transformer TR1 during charging and discharging.

In the isolated DC/DC converter IC, if a voltage of the battery cell connected to the one end's E1 electrodes A and A' is higher than the average voltage Va, the first switching element Q1 may be turned on or off to discharge the battery cell. In this case, a battery cell connected to the other end's E2 electrodes B and B' may be charged with a voltage discharged from the battery cell connected to the one end's E1 electrodes A and A' of the isolated DC/DC converter IC.

In some embodiments, on the contrary, in the isolated DC/DC converter IC, if the voltage of the battery cell connected to the one end's E1 electrodes A and A' is lower than the average voltage Va, the second switching element Q2 may be turned on or off to charge the battery cell connected to the one end's E1 electrodes A and A'. In this case, in the isolated DC/DC converter IC, the battery cell connected to the one end's E1 electrodes A and A' may be charged with a voltage discharged from the battery cell connected to the other end's E2 electrodes B and B.

That is, in the battery module 113 and the energy storage system 100 including the same, since cell voltages are equalized by charging/discharging adjacent cells, it is possible to prevent efficiency from being reduced if discharging is performed through resistors to equalize cell voltages. In some embodiments, in the battery module 113 and the energy storage system 100 including the same, since cell voltages are equalized by charging/discharging one battery cell and one adjacent battery cell, it is possible to prevent increases in size and costs, which are for improving switch withstand voltage characteristics, from occurring if cells are directly equalized with a plurality of battery cells connected in series.

By way of summation and review, an energy storage system (ESS) may be a plurality of battery racks, in which are contained battery modules, which may be further aggregates of a plurality of cells, arranged and accommodated in a vertical direction. A ESS may include battery racks in which battery modules may be arranged and accommodated in a horizontal direction. Notably, the method of arranging and accommodating the battery modules and the battery racks may be variously changed.

A method of vertically stacking and connecting battery modules may be adopted, and the battery modules may be electrically connected to each other in a vertical direction. The battery modules electrically connected in this way may be gathered to constitute one rack. Such racks may be electrically reconnected to each other again to constitute one large-sized battery storage device.

In some embodiments, a battery management system (BMS) may include module BMSs for controlling a plurality of battery cells, rack BMSs for controlling the plurality of module BMSs, a system BMS for controlling the plurality of rack BMSs, and a hub for interfacing the system BMS with an upper controller. Thus, a state of each battery may be monitored, and the monitored state may be transmitted to an upper system, and if a problem occurs, charging/discharging may be cut off and/or a cell balance may be equalized.

In a battery module and an energy storage system including the same, a voltage between two adjacent battery cells among a plurality of battery cells connected in series can be equalized through an isolated DC/DC converter, thereby improving efficiency of cell voltage equalization and simultaneously reducing a size and manufacturing costs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. An energy storage system, comprising:
a plurality of battery cells connected in series;
a plurality of isolated DC/DC converters, each isolated DC/DC converter having one end connected to one battery cell and an other end connected to another battery cell adjacent to the one battery cell so as to equalize a cell voltage between two battery cells which are each electrically connected to one of the plurality of battery cells through charging and discharging, wherein each isolated DC/DC converter includes:
a transformer electrically connected between the one end and the other end of the isolated DC/DC converter,
a first capacitor connected to a primary winding of the transformer in parallel,
a second capacitor electrically connected to a first electrode of a secondary winding of the transformer,
a first inductor connected to the second capacitor in series,
a third capacitor connected to the secondary winding of the transformer in parallel,
a first switching element electrically connected between the first capacitor and the primary winding of the transformer, and
a second switching element including a first electrode electrically connected between the second capacitor and the first inductor and a second electrode electrically connected between the secondary winding of the transformer and the third capacitor; and
a plurality of battery modules each including a controller configured to control a charge mode and a discharge mode of the plurality of isolated DC/DC converters.

2. The energy storage system as claimed in claim 1, wherein the number of the plurality of battery cells is the same as the number of the plurality of isolated DC/DC converters,
the plurality of battery cells includes a first battery cell and second to $X^{th}$ battery cells which are sequentially connected in series, and
the plurality of isolated DC/DC converters includes a first isolated DC/DC converter and second to $X^{th}$ isolated DC/DC converters.

3. The energy storage system as claimed in claim 2, wherein the first isolated DC/DC converter has one end electrically connected to the first battery cell and the other end electrically connected to the second battery cell, and
the $X^{th}$ isolated DC/DC converter has one end electrically connected to the $X^{th}$ battery cell and the other end electrically connected to the first battery cell.

4. The energy storage system as claimed in claim 2, wherein each controller of each of the plurality of battery modules compares an average voltage of the plurality of battery cells with a voltage of each of the battery cells electrically connected to one end of the plurality of isolated DC/DC converters to control through the isolated DC/DC converters the charging/discharging of each of the battery cells electrically connected to the one end of the plurality of isolated DC/DC converters.

5. The energy storage system as claimed in claim 4, comprising a battery rack in which each of the plurality of battery modules are provided and are electrically connected to each other,
wherein a module battery management system (BMS) included in each of the plurality of battery modules includes the plurality of isolated DC/DC converters and a corresponding controller, and
the corresponding controller included in each module BMS communicates with another module BMS.

6. The energy storage system as claimed in claim 5, wherein the average voltage is an average voltage of all of the battery cells included in the battery rack, and
a battery control unit included in the battery rack calculates the average voltage and transmits the calculated average voltage to the plurality of module BMSs included in the battery rack through communication.

7. The energy storage system as claimed in claim 1, wherein the first switching element and the second switching element are turned on or off under control of the controller.

8. The energy storage system as claimed in claim 1, wherein the first switching element includes a first electrode electrically connected to a second electrode of the primary winding of the transformer, a second electrode electrically connected to a second electrode of the first capacitor, and a control electrode electrically connected to the controller,
the second switching element includes a first electrode electrically connected to a second electrode of the secondary winding of the transformer, a second electrode electrically connected to a second electrode of the second capacitor, and a control electrode electrically connected to the controller, and
each of the first switching element and the second switching element is a transistor including a first electrode as a drain electrode, a second electrode as a source electrode, a control electrode, and a body diode.

9. The energy storage system as claimed in claim 1, wherein the first switching element includes a first electrode electrically connected to a first electrode of the first capacitor, a second electrode electrically connected to a first electrode of the primary winding of the transformer, and a control electrode electrically connected to the controller,
the second switching element includes the first electrode electrically connected between the second capacitor and the first inductor, the second electrode electrically connected to a second electrode of the secondary winding of the transformer, and a control electrode electrically connected to the controller, and
each of the first switching element and the second switching element is a transistor including a first electrode as a drain electrode, a second electrode as a source electrode, a control electrode, and a body diode.

10. The energy storage system as claimed in claim 5, wherein the average voltage is an average voltage of all the battery cells included in the battery rack, and each of the plurality of module BMSs calculates the average voltage through receiving from each of the plurality of battery modules information regarding the average voltage of their respective plurality of battery cells.

11. The energy storage system as claimed in claim 1, wherein each isolated DC/DC converter, excepting a last isolated DC/DC converter, has one end connected to one battery cell and the other end connected to another battery cell immediately adjacent to the one battery cell to equalize a cell voltage between the one and another battery cells through charging and discharging, and
the last isolated DC/DC converter has one end connected to the last battery cell and an other end connected to the first battery cell so as to equalize a cell voltage between the first battery cell and the last battery cell.

12. A battery module, comprising:
a plurality of battery cells connected in series;
a plurality of isolated DC/DC converters, each isolated DC/DC converter having one end connected to one battery cell and an other end connected to another battery cell adjacent to the one battery cell so as to equalize a cell voltage between two battery cells which are each electrically connected to one of the plurality of battery cells through charging and discharging, wherein each isolated DC/DC converter includes:
a transformer electrically connected between the one end and the other end of the isolated DC/DC converter,
a first capacitor connected to a primary winding of the transformer in parallel,
a second capacitor connected to a secondary winding of the transformer in parallel,
a first switching element electrically connected between the first capacitor and the primary winding of the transformer, and
a second switching element electrically connected between the second capacitor and the secondary winding of the transformer; and
a controller configured to control a charge mode and a discharge mode of the plurality of isolated DC/DC converters.

13. The battery module as claimed in claim 12, wherein the number of the plurality of battery cells is the same as the number of the plurality of isolated DC/DC converters,
the plurality of battery cells includes a first battery cell and second to $X^{th}$ battery cells which are sequentially connected in series, and
the plurality of isolated DC/DC converters includes a first isolated DC/DC converter and second to $X^{th}$ isolated DC/DC converters.

14. The battery module as claimed in claim 13, wherein the first isolated DC/DC converter has one end electrically connected to the first battery cell and the other end electrically connected to the second battery cell, and
the $X^{th}$ isolated DC/DC converter has one end electrically connected to the $X^{th}$ battery cell and the other end electrically connected to the first battery cell.

15. The battery module as claimed in claim 13, wherein the controller compares an average voltage of the plurality of battery cells with a voltage of each of the battery cells electrically connected to one end of the plurality of isolated DC/DC converters to control charging/discharging of each of the battery cells electrically connected to the one end through the isolated DC/DC converters.

16. The battery module as claimed in claim 12, wherein each isolated DC/DC converter, excepting a last isolated DC/DC converter, has one end connected to one battery cell and the other end connected to another battery cell immediately adjacent to the one battery cell to equalize a cell voltage between the one and another battery cells through charging and discharging, and
the last isolated DC/DC converter has one end connected to the last battery cell and an other end connected to the first battery cell so as to equalize a cell voltage between the first battery cell and the last battery cell.

* * * * *